United States Patent [19]

Goldberg et al.

[11] Patent Number: 5,058,109
[45] Date of Patent: Oct. 15, 1991

[54] EXCLUSIONARY NETWORK ADAPTER APPARATUS AND RELATED METHOD

[75] Inventors: Marshall R. Goldberg; Bruce E. Mann, both of Mason, N.H.; Jesse B. Lipton, Wayland, Mass.

[73] Assignee: Digital Equipment Corporation, Maynard, Mass.

[21] Appl. No.: 373,108

[22] Filed: Jun. 28, 1989

[51] Int. Cl.⁵ ............................................. H04J 3/26
[52] U.S. Cl. ................................ 370/85.13; 370/94.1
[58] Field of Search .............. 370/85.13, 85.14, 94.1, 370/94.3; 340/825.02, 825.52

[56] References Cited

U.S. PATENT DOCUMENTS

| | | | |
|---|---|---|---|
| 4,402,078 | 8/1983 | Athenes et al. | 370/66 |
| 4,466,060 | 8/1984 | Riddle | 364/200 |
| 4,556,972 | 12/1985 | Chan et al. | 370/60 |
| 4,570,220 | 2/1986 | Tetrick et al. | 364/200 |
| 4,597,078 | 6/1986 | Kempf | 370/85.13 |
| 4,627,052 | 12/1986 | Hoare et al. | 370/85.13 |
| 4,646,232 | 2/1987 | Chang et al. | 364/200 |
| 4,661,951 | 4/1987 | Segarra et al. | |
| 4,737,953 | 4/1988 | Koch et al. | 370/85.13 |
| 4,744,078 | 5/1988 | Kowalczyk | 370/85.13 |
| 4,922,503 | 5/1990 | Leone | 370/85.13 |

OTHER PUBLICATIONS

LAN Bridge 100 Technical Manual, Digital Equipment Corporation, 3rd ed., Mar. 1989.

Primary Examiner—Douglas W. Olms
Assistant Examiner—Melvin Marcelo
Attorney, Agent, or Firm—Finnegan, Henderson, Farabow, Garrett and Dunner

[57] ABSTRACT

An apparatus and method for an exclusionary network adapter connected between a network backbone and a local network segment selectively transfers data packets between the network backbone and the local segment. The exclusionary network adapter excludes all local traffic on the local segment from the network backbone but need not perform perfect general filtering from the network backbone to the local segment as in a network bridge. The exclusionary network adapter may include a host computer and disk drives to function as a file or disk server for devices on the local network segment in addition to transferring data packets between the network backbone and the local network segment.

28 Claims, 6 Drawing Sheets

EXCLUSIONARY NETWORK ADAPTER APPARATUS AND RELATED METHOD

BACKGROUND OF THE INVENTION

The present invention relates to the field of local area networks in general and specifically to improvements in managing network traffic between local area network segments and the network backbone.

Local area networks are communication networks extending from several hundred to several thousand feet within a geographical region. These networks provide efficient and high-speed communications between host computers and other devices for the purposes of sharing resources and communicating in a distributed processing environment. For example, local area print servers connected to a local area network eliminate the need for dedicating a printer to each computer. Local area file and disk servers permit the shared use of large data bases without the cost of maintaining multiple copies of the data bases.

One type of local area network that has gained widespread acceptance is the Ethernet local area network. Ethernet is a carrier sense/multiple access with collision detection system (CSMA/CD) utilizing coaxial cable. This system is described in an article by P. M. Metcalfe and D. R. Boggs in *Communications of the ACM*, July, 1976, and is further described in IEEE specification 802. The Ethernet network transmits information between devices connected to the network in data packets or frames that contain a destination address corresponding to one or more of the devices.

A local area network such as Ethernet may connect several hundred or even thousands of devices or nodes. As the number of nodes on the local area network increases, and the traffic on the network also increases, the network may be divided into smaller segments in order to manage the network traffic more efficiently. Specifically, one or more local network segments may be created to isolate local message traffic from the rest of the network. This is particularly useful where, for example, the local traffic consists primarily of data packets transferred between the nodes on the local network segment and a disk server or other type of host computer.

The local segments of a network are connected to a network backbone for transferring data packets between other nodes on the network and other local segments. Networks and network segments are typically connected by using bridges. The function of a bridge is to receive data packets from one network or network segment and to forward those data packets to the other network or network segment if the data packet contains a destination address corresponding to a node on that other network or network segment. Thus, bridges must act as perfect filters between the networks.

A network bridge, however, is an expensive and complex device. In order for the bridge to filter all data packets transferred on the networks connected by the bridge perfectly and thus completely isolate the traffic on one network or network segment from the rest of the network and vice versa, the bridge must store large tables of addresses corresponding to the nodes on the networks. Furthermore, if the number of nodes on the overall network is large, it becomes impractical to filter all data packets from the network backbone to the local network segment perfectly.

SUMMARY OF THE INVENTION

Accordingly, the present invention provides an exclusionary network adapter for connection between two networks, one of which may be a network backbone and the other of which may be a local network segment, that reduces or eliminates the need for expensive bridges. The exclusionary network adapter and it related method of operation may be implemented in a host computer having two ports connected between the network backbone and the local segment of a local area network.

The apparatus of the exclusionary network adapter in accordance with the present invention, as embodied and broadly described herein, is connected between a first network and a second network for selectively transferring data packets between the first and second networks, each of the first and second networks connecting a different plurality of nodes and each of the data packets containing a destination address corresponding to at least one of the nodes. The apparatus according to the invention comprises: storage means for storing data packets transferred over the first and second networks; evaluating means, coupled to the storage means; first transceiver means, connected to the first network and coupled to the evaluating means, for receiving data packets transferred over the first network and for transmitting data packets from the first data buffer area to the first network; and second transceiver means, connected to the second network and coupled to the evaluating means, for receiving data packets transferred over the second network and for transmitting data packets from the second data buffer area to the second network. The storage means includes a first data buffer area containing data packets to be transferred from the second network to the first network, and a second data buffer area containing data packets to be transferred from the first network to the second network. The evaluating means stores in the first data buffer area data packets transferred over the second network which do not contain a destination address corresponding only to one of the nodes connected to the second network, and for storing in the second data buffer area data packets transferred over the first network which contain a destination address corresponding to the nodes connected to the second network and at least some data packets transferred over the first network which contain a destination address not corresponding to the nodes connected to the second network.

The method performed in exclusionary network adapter in accordance with the present invention for selectively transferring data packets between the first and second networks comprises the steps of: receiving data packets transferred over the first network; storing in a first data buffer data packets received from the first network which contain a destination address corresponding to the nodes on the second network and at least some data packets received from the first network which contain a destination address not corresponding to the nodes connected to the second network; transmitting on the second network the data packets stored in the first data buffer; receiving data packets transferred over the second network; storing in a second data buffer data packets received from the second network which do not contain a destination address corresponding only to one of the nodes connected to the second network; and transmitting on the first network the data packets stored in the second data buffer.

The apparatus and method of the exclusionary network adapter of this invention improve the overall network performance by excluding local traffic on the local network segment from the network backbone. The network adapter need not filter the data packets transferred from the network backbone to the local network segment perfectly, if at all, and thus, the adapter need not perform the general perfect filtering which is the most expensive and complex function to implement in a bridge. If all local traffic on all local network segments having a high volume of local traffic is excluded from the network backbone, the need for expensive bridges is greatly reduced or eliminated.

Furthermore, the exclusionary network adapter and related method of this invention can provide added security to the overall network. The network adapter may be used to avoid propagation of data packets beyond a local network segment by keeping all local traffic off the network backbone. Using the exclusionary network adapter for this purpose therefore reduces or eliminates the need for expensive network encryption devices.

It is to be understood that both the foregoing general description and the following detailed description are exemplary and explanatory only and are not restrictive of the invention as claimed.

The accompanying drawings, which are incorporated in and constitute a part of the specification, illustrate several embodiments of the invention and together with the general description, serve to explain the principles of the invention.

DESCRIPTION OF THE PREFERRED EMBODIMENTS

Reference will now be made in detail to the presently preferred embodiments of the invention, examples of which are illustrated in the accompanying drawings.

The exclusionary network adapter of this invention is connected between a first network and a second network for selectively transferring data packets between the two networks. In the configuration shown in FIG. 1A, exclusionary network adapter 10 is connected between a first network, which is a network backbone 20, and a second network, which is a local network segment 30. In addition to selectively transferring data packets between the two networks, the exclusionary network adapter 10 may also provide other services. For example, the network adapter 10 may include a host computer and be connected to various optical or magnetic disks 40 to function as a file or disk server for the devices on the local network segment 30.

Figure 1A:
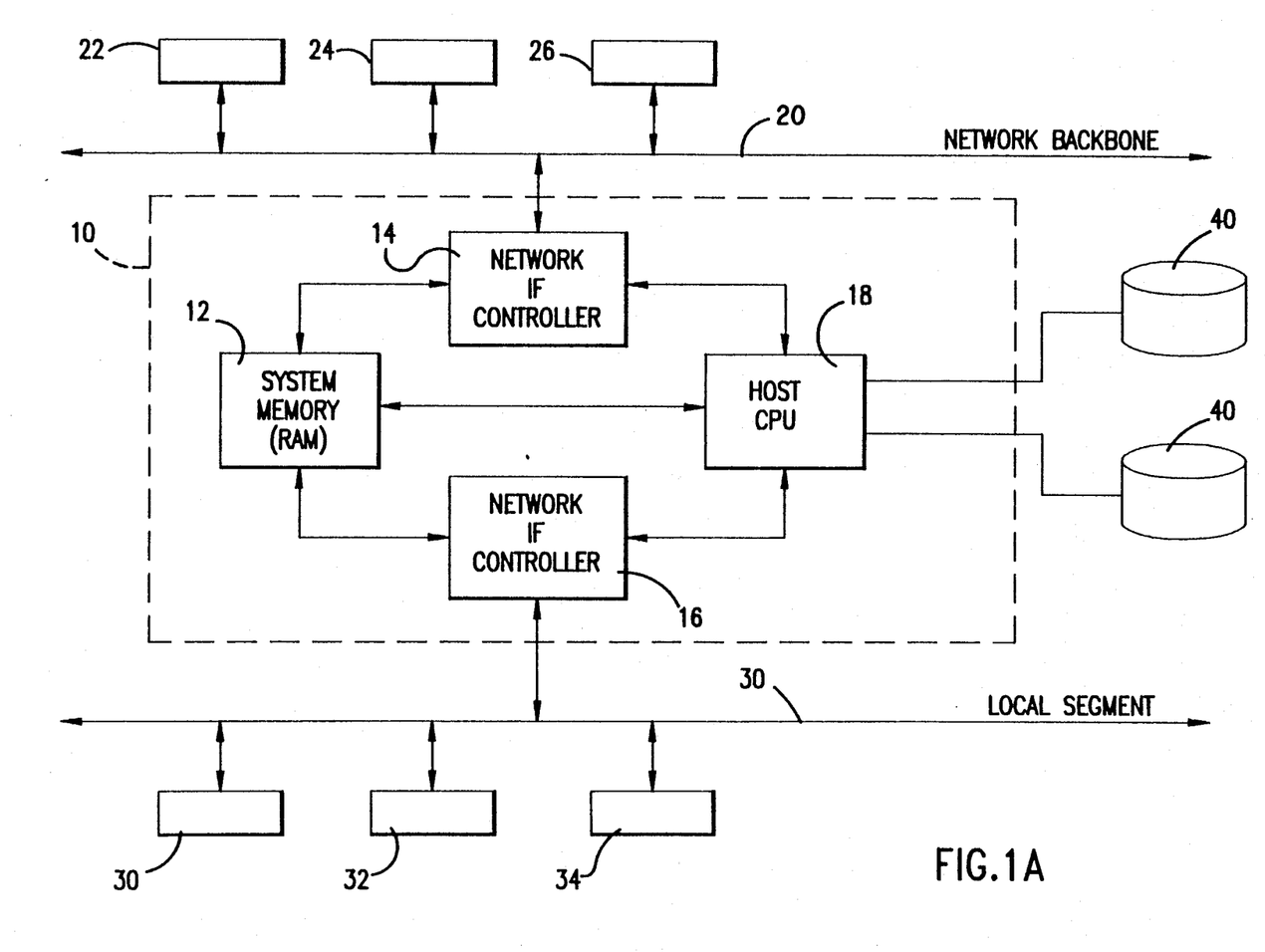
FIG. 1A is a schematic block diagram of the apparatus of the exclusionary network adapter connected between a network backbone and a local segment of a local area network.

The network backbone 20 and the local segment 30 each connect a different plurality of nodes. In FIG. 1A, the network backbone 20 connects nodes 22, 24, and 26, as well as the exclusionary network adapter 10. Local network segment 30 connects nodes 32, 34, 36, and the network adapter 10. Other local segments may also be connected to the network backbone 20 either through conventional bridges or other exclusionary network adapters.

Each node connected to the network backbone 20 or any local network segment, including the exclusionary network adapter 10 itself, is assigned a physical address that uniquely identifies the node within the overall network. In an Ethernet network, for example, the physical address for each node is 48 bits long.

Data packets transferred over the network, whether over the network backbone 20 or a local network segment, each contain a destination address corresponding to at least one of the nodes in the network. The destination address of the data packet may correspond to only a single node, to a specific group of nodes, or even to all nodes. For example, in Ethernet, a destination address of all ones ("111 ... 1") is a broadcast address indicating that the data packet is received by all nodes in the network. Other addresses can identify specific groups of nodes. Each data packet also contains a source address corresponding to the node that transmitted the data packet over the network.

The exclusionary network adapter 10 selectively transfers data packets between the network backbone 20 and the local segment 30 according to the following rules. The network adapter 10 receives all data packets transferred over both the network backbone 20 and the local segment 30. The network adapter 10 transmits to the network backbone 20 all data packets transferred over the local segment 30 except for local traffic which is specifically excluded from the network backbone 20. Local traffic consists of data packets transferred over the local segment 30 which contain a destination address corresponding only to one of the nodes on the local segment 30 or the network adapter 10 itself. For example, data packets transferred over the local segment 30 containing a destination address corresponding only to nodes 32, 34, 36, or the network adapter 10 would be excluded from the network backbone 20 by network adapter 10. Data packets transferred over the local segment 30 containing a destination address corresponding to nodes 22, 24, or 26, or to all nodes in the network would be transmitted to the network backbone 20 by network adapter 10.

The exclusionary network adapter 10 also transmits to the local segment 30 all data packets transferred over the network backbone 20 containing a destination address corresponding to the nodes connected to the local segment 30 and at least some data packets transferred over the network backbone 20 which contain a destination address not corresponding to the nodes connected to the local segment 30. In its simplest form, the network adapter 10 may transmit on the local segment 30 all data packets transferred over the network backbone 20 regardless of the destination address. The nodes on the local segment 30 then simply ignore those data packets that are not specifically addressed to them.

The network adapter 10 may also filter the data packets transferred over the network backbone 20 according to a logical address filter performed on the destination address of the data packets. This type of imperfect filtering allows some data packets containing a destination address not corresponding to the nodes on the local segment 30 to pass through the network adapter 10 from the network backbone 20 to the local segment 30. The number of data packets passing through to the local segment 30, however, will be significantly reduced without having to implement a perfect general filter as in a bridge.

In order to selectively transfer data packets between the network backbone 20 and the local segment 30 according to these rules, the exclusionary network adapter 10 must know the physical addresses corresponding to the nodes on the local segment 30. This knowledge may be accomplished in a variety of ways, including a configuration program in a host computer. Another way is by storing the source addresses of data packets transferred over the local segment 30. Still another way is by the nodes on the local segment 30 telling the network adapter 10 by sending data packets indicating their physical addresses. Unlike a bridge, however, the network adapter 10 need not know the physical addresses corresponding to the rest of the nodes on the network backbone 20 or any other local network segment.

In accordance with the invention, the apparatus of the exclusionary network adapter includes storage means for storing data packets transferred over the network backbone 20 and the local segment 30. As embodied in FIG. 1A, the storage means comprises a random access memory (RAM) 12.

Figure 1B:
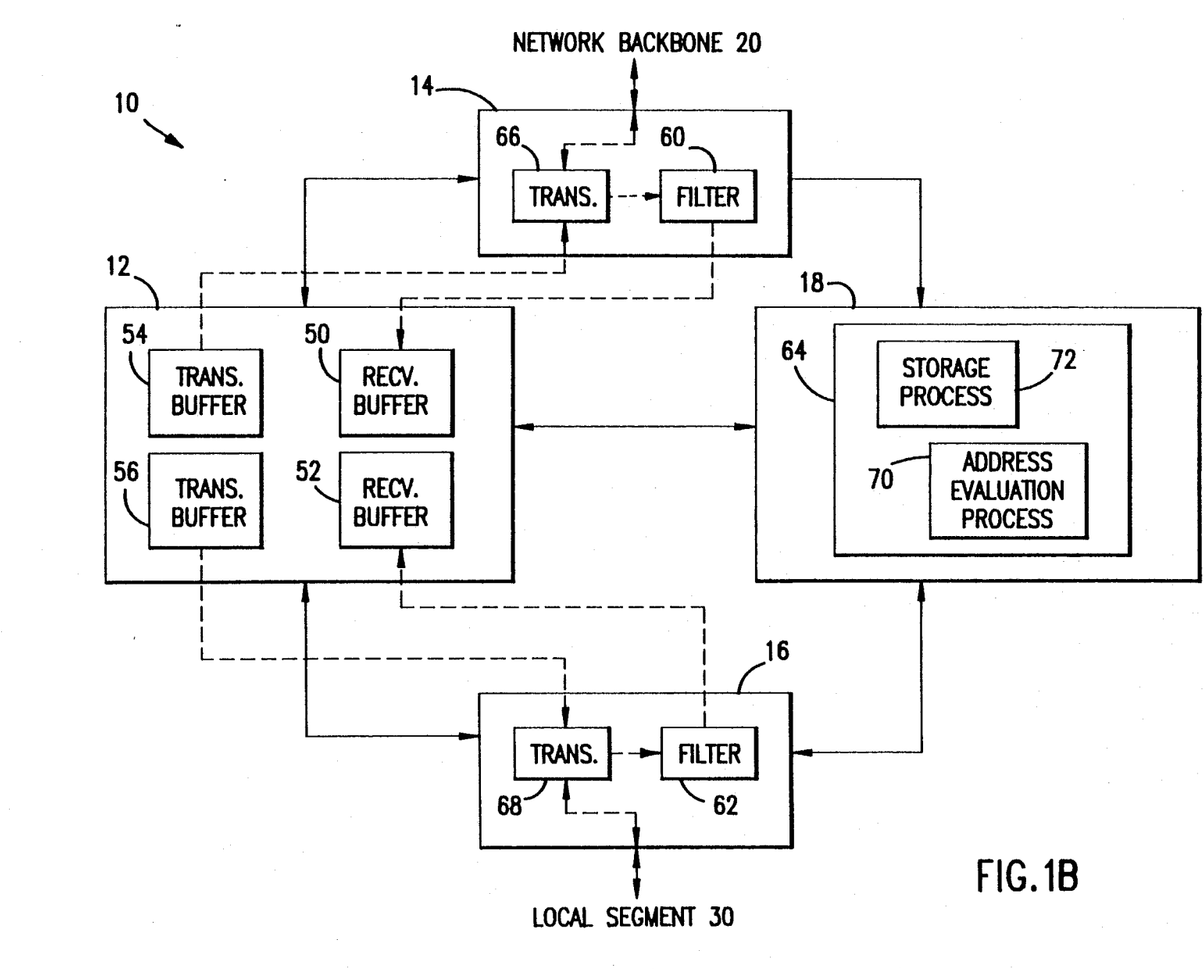
FIG. 1B is a schematic block diagram showing the apparatus of the exclusionary network adapter in greater detail.

FIG. 1B shows exclusionary network adapter 10 in greater detail. As shown in FIG. 1B, predetermined portions of RAM 12 are set aside as receiver data buffer areas 50 and 52 for storing data packets transferred over the network backbone 20 and the local segment 30, respectively. Likewise, RAM 12 also includes first and second transmit data buffer area 54 and 56 for storing data packets to be transferred from the network backbone 20 to the local segment 30 and from the local segment 30 to the network backbone 20, respectively.

In accordance with the present invention, coupled to the storage means is an evaluating means for storing in the first transmit data buffer area 54 those data packets transferred over the local segment 30 that do not contain a destination address corresponding only to one of the nodes connected to the local segment 30. The evaluating means also stores in the second transmit data buffer area 56 those data packets transferred over the network backbone 20 that contain a destination address corresponding only to one of the nodes connected to the local segment 30 and at least some data packets transferred over the network backbone 20 that contain a destination address not corresponding to the nodes connected to the local segment 30.

In FIG. 1A, the evaluating means includes a host computer central processing unit (CPU) 18 and network interface controllers 14 and 16. Both the CPU 18 and controllers 14 and 16 are coupled to RAM 12 for accessing and storing data in the data buffer areas of RAM 12. CPU 18 is also directly connected to each of controllers 14 and 16 as shown in FIG. 1A for initialization of the controllers by the CPU 18 and for synchronizing the timing between the units.

As shown in greater detail in FIG. 1B, the evaluating means preferably includes a program 64 executing in CPU 18 and address filters 60 and 62 of controllers 14 and 16, respectively. If controller 14 is operated in a "promiscuous" addressing mode for receiving data packets from the network backbone 20, filter 60 may pass all data packets transferred over the network backbone which are then stored in receiver data buffer area 50. Alternatively, filter 60 may filter the data packets according to a logical address filter performed on the destination address of the data packets. A logical address filter filters the data packets by computing a cyclic redundancy check (CRC) on the destination address. The CRC is then used as an index into a table of bits which indicates whether the data packet should be stored in the receiver data buffer area 50 or discarded.

For each data packet stored in the receiver data buffer area 50, an address evaluation process 70 of program 64 executing in CPU 18 of the host computer determines whether the data packet contains a destination address corresponding only to the host computer. A data packet storage process 72 of program 64 then stores in the transmit data buffer area 56 only those data packets transferred over the network backbone 20 which do not contain a destination address corresponding only to the host computer.

Controller 16 may also be operated in a "promiscuous" addressing mode for receiving data packets transferred over the local segment 30. In this mode, filter 62 passes and stores all data packets transferred over the local segment 30 in receiver data buffer area 52. For each data packet stored in receiver data buffer area 52, the address evaluation process 70 of program 64 executing in CPU 18 determines whether the data packet contains a destination address corresponding only to one of the nodes on the local segment 30 or to the host computer. The data packet storage process 72 of program 64 then stores in the transmit data buffer 54 only those data packets transferred over the local segment which do not contain a destination address corresponding only to one of the nodes connected to local segment 30 or to the host computer.

Alternatively, filter 62 of controller 16 may filter the data packets transferred over the local segment 30 to exclude all data packets containing a destination address corresponding only to one of the nodes connected to local segment 30. Then, for each data packet stored in the receiver data buffer area 52, the address evaluation process of program 64 executing in CPU 18 of the host computer determines only whether the data packet contains a destination address corresponding only to the host computer. The packet storage process of program 64 stores in the transmit data buffer 54 only those data packets transferred over the local segment 30 which were not excluded by filter 62 and which do not contain a destination address corresponding only to the host computer.

The apparatus of the exclusionary network adapter also includes first and second transceiver means connected to the network backbone 20 and the local segment 30, respectively, and coupled to the storage means and to the evaluating means. As shown in FIG. 1B, a first transceiver 66 receives data packets transferred over the network backbone 20 and transmits data packets from the first transmit data buffer area 54 to the network backbone 20. A second transceiver 68 receives data packets transferred over the local segment 30 and transmits data packets from the second transmit data buffer area 56 to the local segment 30.

In a specific embodiment of the apparatus of FIGS. 1A and 1B, controllers 14 and 16 may each be a Local Area Network Controller for Ethernet ("LANCE"), available from Advanced Micro Devices, Inc. of Sunnyvale, Calif., as "Am7990". The LANCE is described in *MOS Microprocessors and Peripherals Data Book*, (Advanced Micro Devices, Inc., Sunnyvale, Calif. 1985) at pages 2-50 to 2-86.

The Ethernet CSMA/CD network access method is implemented completely within the LANCE. In the transmit mode, the LANCE directly accesses data in a transmit buffer in memory. It prefaces the data with a sync pattern and calculates and appends a CRC, and then begins to transmit the data packet to the Ethernet.

The LANCE can receive data packets using three different destination addressing schemes: physical, logical, and promiscuous. The first type is a full comparison of the 48-bit Ethernet destination address contained in the data packet with a physical node address that was programmed into the LANCE during an initialization cycle. In the logical addressing mode, the 48-bit address is put through a hash filter in order to map the 48-bit physical addresses into one of 64 logical groups. The last receive mode of operation is the so-called "promiscuous" mode in which all data packets are accepted regardless of destination address.

The LANCE communicates with the host computer primarily through shared memory locations. A circular queue of tasks called descriptor rings is stored in memory. There are separate descriptor rings to describe transmit and receive operations. Each entry in a descriptor ring holds a pointer to a data buffer and an entry for the length of the data buffer. As each receiver data buffer is filled, for example, an "own" bit is set to "0" in the receiver descriptor entry, allowing the host computer to process the data packet in the buffer.

Figure 2A:
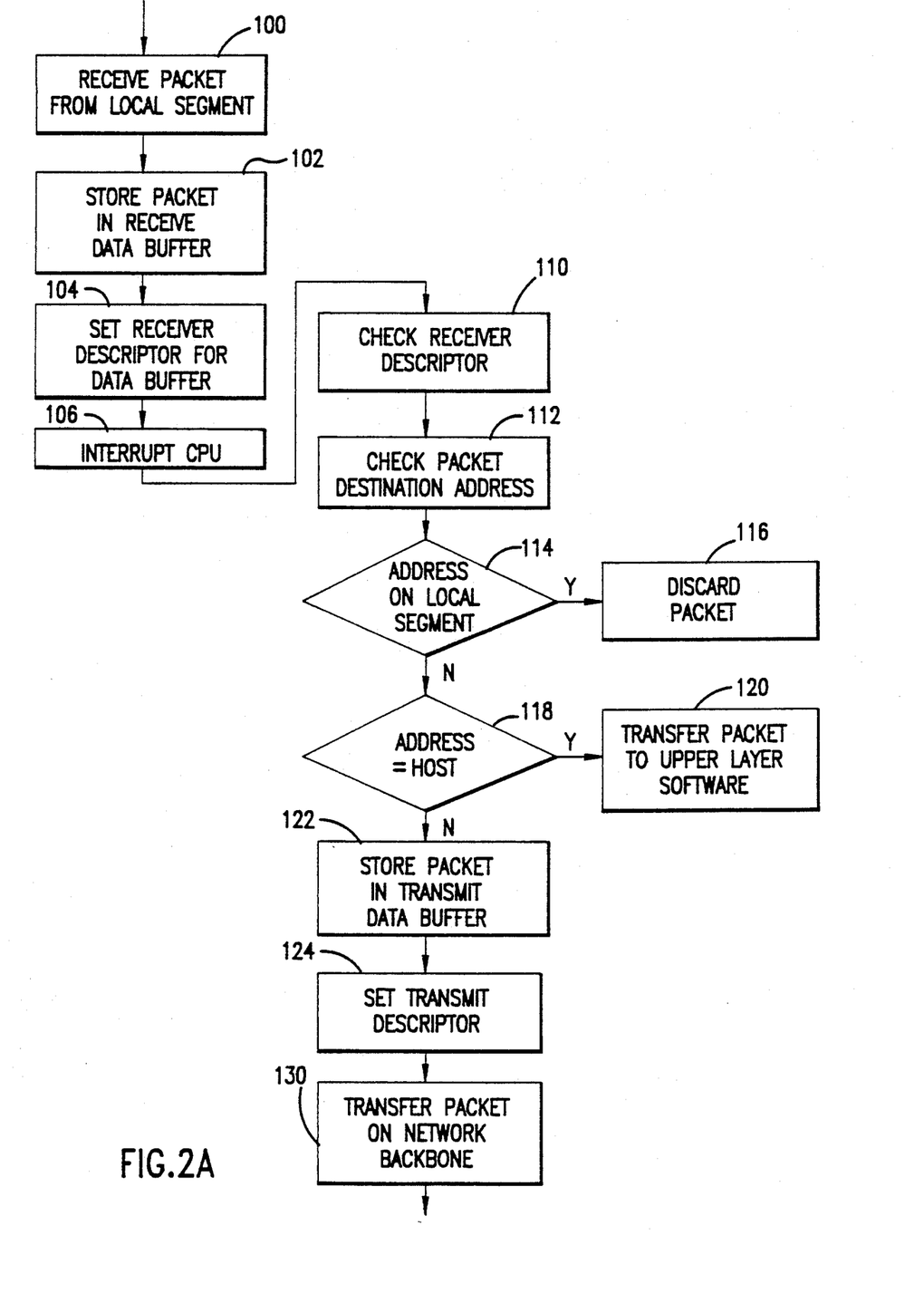
FIGS. 2A and 2B are flow diagrams of the steps performed in the exclusionary network adapter according to one embodiment of the invention.
Figure 2B:
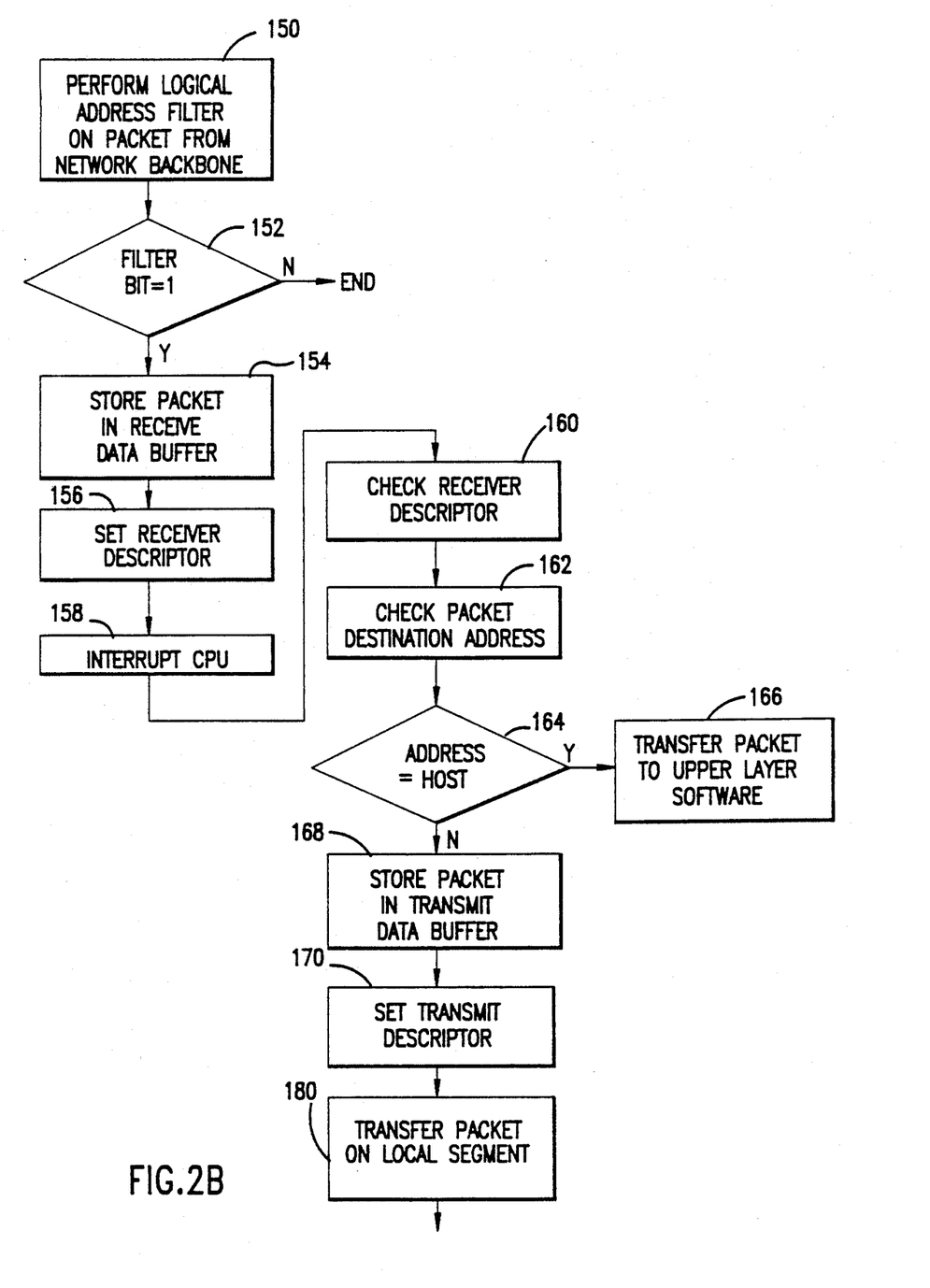

The sequence of operation of this embodiment of the exclusionary network adapter in which controllers 14 and 16 are LANCEs is shown in FIGS. 2A and 2B. FIG. 2A is a flow diagram of the steps performed in the network adapter for handling data packets transferred over the local segment 30, and FIG. 2B is a flow diagram of the steps performed in the network adapter for handling data packets transferred over the network backbone 20.

In FIG. 2A, steps 100-106 are preferably performed by controller 16, steps 110-124 are preferably performed by a program executing in CPU 18, and step 130 is preferably performed by controller 14. According to this embodiment, the LANCE of controller 16 is operated in a "promiscuous" addressing mode for receiving data packets. In this addressing mode, the LANCE of controller 16 receives and stores in the receiver data buffer area 52 of RAM 12 all data packets transferred over local segment 30. Thus, in the first step of FIG. 2A, controller 16 receives a data packet transferred over local segment 30 (step 100). The controller 16 then stores the data packet received from the local segment in the receiver data buffer area 52 in RAM 12 (step 102). After the data packet received from the local segment 30 is stored in the receiver data buffer area 52 in RAM 12, controller 16 sets the descriptor entry in the receiver descriptor ring for the receiver data buffer area (step 104). Controller 14 then interrupts CPU 18 to indicate that a data packet has been received from local segment 30 (step 106).

A program executing in CPU 18 in response to the interrupt received from controller 16 performs steps 110-124 in FIG. 2A. The program in CPU 18 first reads the descriptor entry in the receiver descriptor ring for controller 16 in RAM 12 and checks the descriptor entry to make sure that the "own" bit is "0" (step 110). The program then reads the destination address of the data packet received from local segment 30 that is stored in the receiver data buffer 52 in RAM 12 (step 112).

If the program executing in CPU 18 determines that the destination address corresponds only to one of the nodes connected to local segment 30 (step 114), then the data packet is discarded (step 116). The comparison in step 114 requires previous knowledge of the physical addresses corresponding to the nodes connected to local segment 30 which may be stored, for example, in a table in RAM 12. If the program determines that the destination address is the same as the physical address corresponding to the host computer of the exclusionary network adapter (step 118), then the data packet is transferred to upper layer software executing in CPU 18 for further processing (step 120). Data packets may be sent to the host computer in the network adapter if, for example, the network adapter also provides other services to the nodes on the local segment such as a file or disk server.

If the destination address does not correspond only to one of the nodes on local segment 30 or the host computer of the exclusionary network adapter, then the program executing in CPU 18 stores the data packet received from local segment 30 in the transmit data buffer area 54 associated with controller 14 in RAM 12 (step 122). The program then sets the descriptor entry in the transmit descriptor ring for the transmit data buffer area 54 (step 124).

The LANCE of controller 14 searches the descriptor ring for the transmit data buffer area 54 in RAM 12 to determine the next data packet to be transferred over the network backbone 20. In the preferred embodiment, controller 14 prefaces the data packet stored in the transmit data buffer area 54 with a sync pattern, calculates and appends a 32-bit CRC, and transmits the data packet to the network backbone 20 (step 130).

The LANCE in controller 14 may also be operated in a "promiscuous" addressing mode, in which controller 14 receives and stores in the receiver data buffer area 50 of RAM 12 all data packets transferred over network backbone 20, or it may be operated in "logical" addressing mode. If the first bit of the destination address of an incoming data packet is a "1," the address is passed through a logical address filter. In the logical address filter, the destination address is sent through a CRC circuit. Certain bits of the resultant CRC are used to select a particular bit position in a table of the logical address filter. If the selected bit in the table is a "1," the address is accepted and the data packet will be stored in the receiver data buffer area in RAM 12. The bits in the logical address filter are set according to the same CRC performed on the physical addresses corresponding to the nodes connected to local segment 30. Thus, the logical address filter only assures that there is a possibility that the data packet belongs to one of the nodes connected to local segment 30.

In FIG. 2B, steps 150-158 are preferably performed by controller 14, steps 160-170 are preferably performed by a program executing in CPU 18, and step 180 is preferably performed by controller 16. In the first step of FIG. 2B, controller 14 receives a data packet transferred over network backbone 20 and performs the logical address filter on the destination address contained in the data packet (step 150). If the bit position in the logical address filter is "1" (step 152), then controller 14 stores the data packet received from the network backbone 20 in the receiver data buffer area 50 in RAM 12 (step 154). Otherwise, the data packet is not stored.

If the data packet received from the network backbone 20 is stored in the receiver data buffer area 50 in RAM 12, controller 14 sets the descriptor entry in the receiver descriptor ring for the receiver data buffer area 52 (step 156). Controller 14 then interrupts CPU 18 to indicate that a data packet has been received from network backbone 20 (step 158).

The program executing in CPU 18 in response to the interrupt received from controller 14 performs steps 160-170 in FIG. 2B. The program in CPU 18 first checks the descriptor entry in the receiver descriptor ring for controller 14 in RAM 12 to make sure that the "own" bit is "0" (step 160). The program then reads the destination address of the data packet received from the network backbone 20 that is stored in the receiver data buffer 50 in RAM 12 (step 162).

If the program executing in CPU 18 determines that the destination address is the same as the physical address corresponding to the host computer of the exclusionary network adapter (step 164), then the data packet is transferred to upper layer software executing in CPU 18 for further processing (step 166). Otherwise, the program executing in CPU 18 stores the data packet received from the network backbone 20 in the transmit data buffer area 56 associated with controller 16 in RAM 12 (step 168). The program then sets the descriptor entry in the transmit descriptor ring for the transmit data buffer area 56 (step 170).

The LANCE of controller 16 searches the descriptor ring for the transmit data buffer area 56 in RAM 12 to determine the next data packet to be transferred over the local segment 30 and transmits the data packet to the local segment 30 (step 180).

In another embodiment of the invention, controller 14 in FIGS. 1A and 1B may be a Second Generation Ethernet Chip ("SGEC"). As in the LANCE, the Ethernet CSMA/CD network access method is implemented completely within the SGEC. The SGEC may also be operated in a promiscuous addressing mode for receiving all data packets or it may be operated in one of two address filtering modes. In one address filtering mode, the SGEC perfectly filters up to 14 Ethernet physical or multicast addresses. This address filtering mode may be used when the number of nodes on the local segment 30 is less than 14. In the other address filtering mode, the SGEC perfectly filters one single physical address and imperfectly filters an unlimited number of multicast addresses using a logical address filter.

Controller 16 in this second embodiment may be a modified SGEC that performs a perfect "exclusive" filter on up to 14 Ethernet addresses. Instead of storing only those data packets that contain a destination address that is one of the 14 specified addresses, the modified SGEC will store those data packets that contain a destination address that is not one of the 14. The 14 physical addresses are selected to correspond to the nodes connected to the local segment 30. Thus, the modified SGEC performs a perfect "exclusive" address filter by excluding only those data packets that contain a destination address corresponding only to one of the nodes connected to local segment 30. Data packets that contain a destination address corresponding to the host computer or nodes on the network backbone 20 are passed through.

Figure 3A:
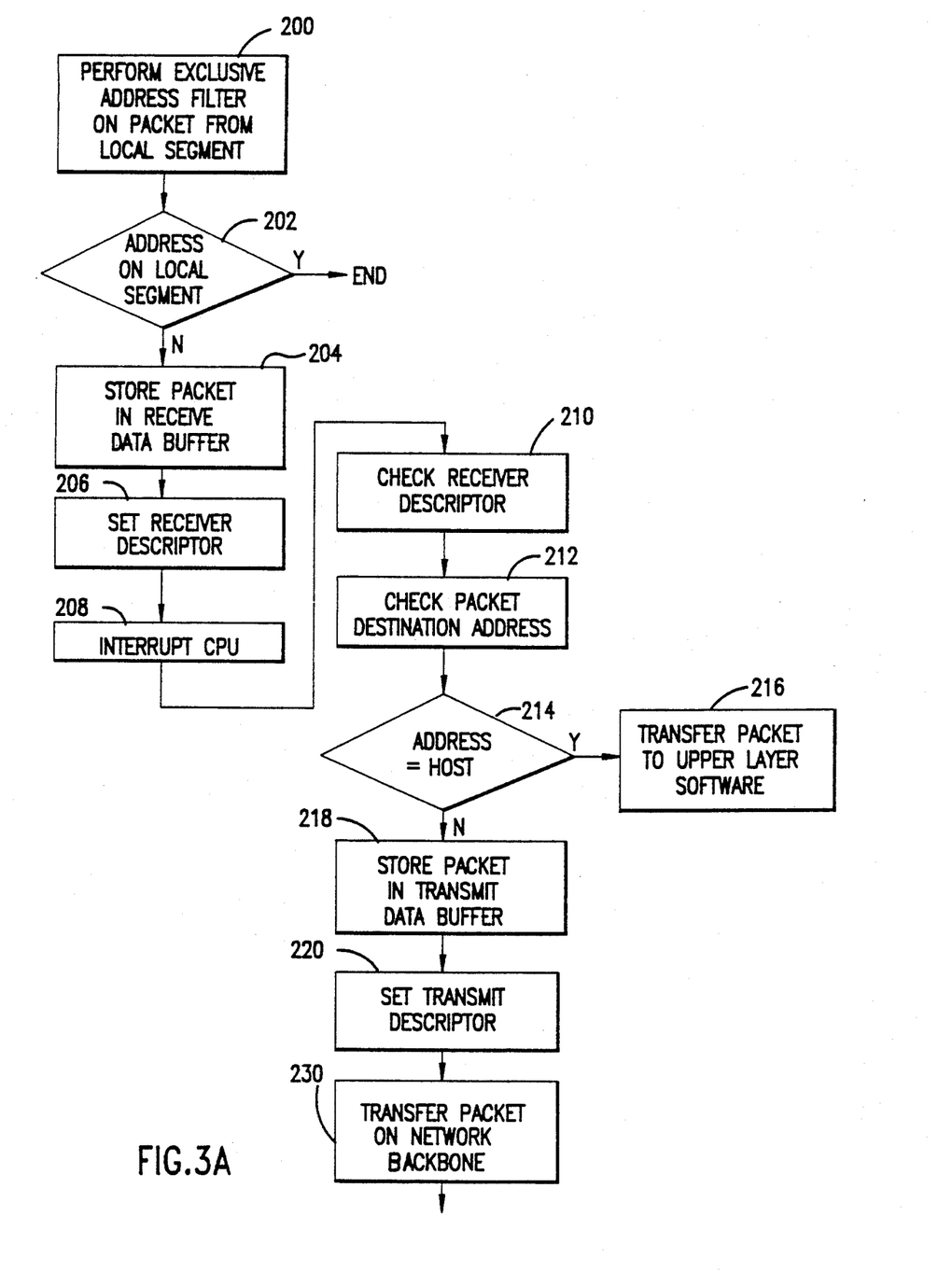
FIGS. 3A and 3B are flow diagrams of the steps performed in the exclusionary network adapter according to another embodiment of the invention.
Figure 3B:
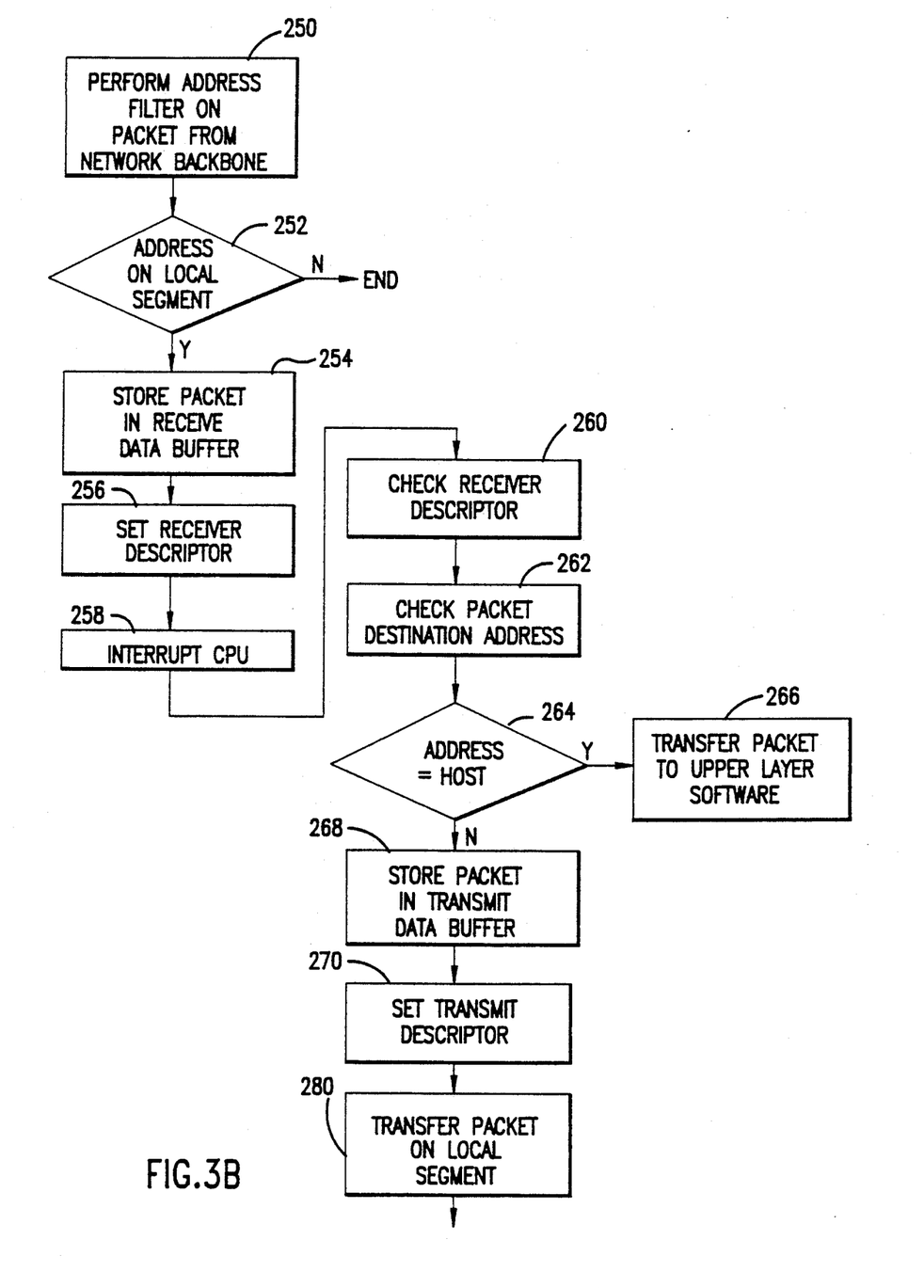

The sequence of operation of this second embodiment of the exclusionary network adapter in which controllers 14 and 16 are a SGEC and modified SGEC, respectively, is shown in FIGS. 3A and 3B. FIG. 3A is a flow diagram of the steps performed in the network adapter for handling data packets transferred over the local segment 30, and FIG. 3B is a flow diagram of the steps performed in the network adapter for handling data packets transferred over the network backbone 20.

In FIG. 3A, steps 200-208 are preferably performed by controller 16, steps 210-220 are preferably performed by a program executing in CPU 18, and step 230 is preferably performed by controller 14. According to this embodiment, the modified SGEC of controller 16 is operated in the exclusive address filtering mode for receiving data packets. This requires previous knowledge of the physical addresses corresponding to the nodes connected to local segment 30 which are stored in a setup frame when the modified SGEC is initialized.

In the first step of FIG. 3A, controller 16 receives a data packet transferred over local segment 30 and performs the exclusive address filter on the destination address contained in the data packet (step 200). If the destination address does not correspond only to one of the nodes on the local segment 30 (step 202), then controller 16 stores the data packet received from the local segment 30 in the receiver data buffer area 52 in RAM 12 (step 204). Otherwise, the data packet is not stored.

If the data packet received from the local segment 30 is stored in the receiver data buffer area 52 in RAM 12, controller 16 sets the descriptor entry in the receiver descriptor ring for the receiver data buffer area 52 (step 206). Controller 16 then interrupts CPU 18 to indicate that a data packet has been received from the local segment 30 (step 208).

The program executing in CPU 18 in response to the interrupt received from controller 16 performs steps 210-220 in FIG. 3A. The program in CPU 18 first reads the descriptor entry in the receiver descriptor ring for controller 16 in RAM 12 and checks the descriptor entry to make sure that the "own" bit is "0" (step 210). The program then reads the destination address of the data packet received from local segment 30 that is stored in the receiver data buffer area 50 in RAM 12 (step 212).

If the program executing in CPU 18 determines that the destination address is the same as the physical address corresponding to the host computer of the exclusionary network adapter (step 214), then the data packet is transferred to upper layer software executing in CPU 18 for further processing (step 216). Otherwise, the program executing in CPU 18 stores the data packet received from the local segment 30 in the transmit data buffer area 56 associated with controller 14 in RAM 12 (step 218). The program then sets the descriptor entry in the transmit descriptor ring for the transmit data buffer area 56 (step 220).

The SGEC of controller 14 searches the descriptor ring for the transmit data buffer area 56 in RAM 12 to determine the next data packet to be transferred over the network backbone 20 and transmits the data packet to the network backbone 20 (step 230).

In FIG. 3B, steps 250-258 are preferably performed by controller 14, steps 260-270 are preferably performed by a program executing in CPU 18, and step 280 is preferably performed by controller 16. When the preferred embodiment of the invention uses the method in FIG. 3B, the SGEC of controller 14 perfectly filters the data packets according to the physical addresses of the nodes connected to local segment 30. This requires previous knowledge of the physical addresses corresponding to the nodes connected to local segment 30 which are stored in a setup frame when the SGEC is initialized.

In the first step of FIG. 3B, controller 14 receives a data packet transferred over network backbone 20 and performs the address filter on the destination address contained in the data packet (step 250). If the destination address corresponds to one of the nodes on the local segment 30 (step 252), then controller 14 stores the data packet received from the network backbone 20 in the receiver data buffer area 50 in RAM 12 (step 254). Otherwise, the data packet is not stored.

If the data packet received from the network backbone 20 is stored in the receiver data buffer area 50 in RAM 12, controller 14 sets the descriptor entry in the receiver descriptor ring for the receiver data buffer area 50 (step 256). Controller 14 then interrupts CPU 18 to indicate that a data packet has been received from network backbone 20 (step 258).

The program executing in CPU 18 in response to the interrupt received from controller 14 performs steps 260-270 in FIG. 3B. The program in CPU 18 first checks the descriptor entry in the receiver descriptor ring for controller 14 in RAM 12 to make sure that the "own" bit is "0" (step 260). The program then reads the destination address of the data packet received from the network backbone 20 that is stored in the receiver data buffer area 50 in RAM 12 (step 262).

If the program executing in CPU 18 determines that the destination address is the same as the physical address corresponding to the host computer of the exclusionary network adapter (step 264), then the data packet is transferred to upper layer software executing in CPU 18 for further processing (step 266). Otherwise, the program executing in CPU 18 stores the data packet received from the network backbone 20 in the transmit data buffer area 56 associated with controller 16 in RAM 12 (step 268). The program then sets the descriptor entry in the transmit descriptor ring for the transmit data buffer area 56 (step 270).

The modified SGEC of controller 16 searches the descriptor ring for the transmit data buffer area 56 in RAM 12 to determine the next data packet to be transferred over the local segment 30 and transmits the data packet to the local segment 30 (step 280).

In a further embodiment of this invention, controllers 14 and 16 may each include a bit stream filtering device described in the commonly-assigned U.S. patent application Ser. No. 200,698, filed May 31, 1988, entitled "Apparatus for Processing Bit Streams." The bit stream filtering device filters an incoming bit stream and generates an index indicating how the bit stream should be further processed. One or more programmable hardware comparators compare a predetermined portion or field of the bit stream with a stored table of comparison values. If the portion of the bit stream being compared is the 48-bit destination address of an incoming data packet, for example, the table could store the 48-bit physical addresses corresponding to the nodes connected to the local segment 30. Based on the results of the hardware comparison, the incoming data packet may be stored in a receiver data buffer in memory or discarded. The results of the comparison are also used to generate an index value that is included in the receiver descriptor entry in memory associated with the receiver data buffer in which the data packet is stored.

This embodiment of the exclusionary network adapter may be used to advantage when the number of nodes on the local segment is larger than number of addresses that the modified SGEC can exclude. CPU 18 can also access the index value in receiver descriptor and process the data packet stored in the receiver data buffer according to the index instead of having to examine the data packet itself. For example, if the index already identifies the destination address contained in the data packet, the host computer need not perform a 48-bit software comparison of the destination address.

The sequence of operation of this embodiment of the exclusionary network adapter in which controllers 14 and 16 include bit stream filtering devices may be the same as shown in FIGS. 3A and 3B or may be modified through programming of the respective bit stream filtering devices.

It will be apparent to those skilled in the art that various modifications and variations can be made in the exclusionary network adapter of the present invention and in construction of this network adapter without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus connected between a first network and a second network for selectively transferring data packets between the first and second networks, each of the first and second networks connecting a different plurality of nodes and each of the data packets containing a destination address corresponding to at least one of the nodes, the apparatus comprising:
   storage means for storing data packets transferred over the first and second networks, said storage means including
      a first data buffer area containing data packets to be transferred from the second network to the first network, and
      a second data buffer area containing data packets to be transferred from the first network to the second network;
   evaluating means, coupled to the storage means, for storing in the first data buffer area data packets transferred over the second network which do not contain a destination address corresponding only to one of the nodes connected to the second network, and for storing in the second data buffer area data packets transferred over the first network which contain a destination address corresponding to the nodes connected to the second network and at least some data packets transferred over the first network which contain a destination address not corresponding to the nodes connected to the second network;
   first transceiver means, connected to the first network and coupled to the evaluating means, for receiving data packets transferred over the first network and for transmitting data packets from the first data buffer area to the first network; and
   second transceiver means, connected to the second network and coupled to the evaluating means, for receiving data packets transferred over the second network and for transmitting data packets from the second data buffer area to the second network.

2. The apparatus of claim 1 wherein the evaluating means includes a host computer comprising:

means for determining whether the data packets transferred over the second network contain a destination address corresponding only to one of the nodes connected to the second network or to the host computer; and means for storing in the first data buffer area data packets transferred over the second network which do not contain a destination address corresponding only to one of the nodes connected to the second network or to the host computer.

3. The apparatus of claim 2 wherein the apparatus is a disk server for the nodes connected to the first and second networks, the apparatus further comprising a disk drive connected to the host computer, and wherein the host computer includes means for processing data packets containing a destination address corresponding to the host computer.

4. The apparatus of claim 1 wherein the evaluating means includes means for filtering the data packets transferred over the second network to exclude all data packets having a destination address corresponding only to one of the nodes connected to the second network.

5. The apparatus of claim 4 wherein the evaluating means further includes a host computer comprising:

means for determining whether the data packets transferred over the second network which are not filtered by the filtering means contain a destination address corresponding only to the host computer; and means for storing in the first data buffer area data packets transferred over the second network which are not filtered by the filtering means and which do not contain a destination addresses corresponding only to the host computer.

6. The apparatus of claim 5 wherein the apparatus is a disk server for the nodes connected to the first and second networks, the apparatus further comprising a disk drive connected to the host computer, and wherein the host computer includes means for processing data packets containing a destination address corresponding to the host computer.

7. The apparatus of claim 1 wherein the evaluating means includes a host computer comprising:

means for determining whether the data packets transferred over the first network contain a destination address corresponding only to the host computer; and means for storing in the second data buffer area data packets transferred over the first network which do not contain a destination address corresponding only to the host computer.

8. The apparatus of claim 7 wherein the apparatus is a disk server for the nodes connected to the first and second networks, the apparatus further comprising a disk drive connected to the host computer, and wherein the host computer includes means for processing data packets containing a destination address corresponding to the host computer.

9. The apparatus of claim 1 wherein the evaluating means includes means for filtering the data packets transferred over the first network according to a logical address filter performed on the destination address of the data packets transferred over the first network.

10. The apparatus of claim 9 wherein the evaluating means further includes a host computer comprising:

means for determining whether the data packets transferred over the first network which are not filtered by the filtering means contain a destination address corresponding only to the host computer; and means for storing in the second data buffer area data packets transferred over the first network which are not filtered by the filtering means and which do not contain a destination addresses corresponding only to the host computer.

11. The apparatus of claim 10 wherein the apparatus is a disk server for the nodes connected to the first and second networks, the apparatus further comprising a disk drive connected to the host computer, and wherein the host computer includes means for processing data packets containing a destination address corresponding to the host computer.

12. The apparatus of claim 1 wherein the evaluating means stores in the second data buffer area all data packets transferred over the first network.

13. A system for transferring data packets between nodes connected by a plurality of networks, each of the data packets containing a destination address corresponding to at least one of the nodes, the system comprising:

a first network connecting a first plurality of nodes;

a second network connecting a second plurality of nodes; and a network adapter apparatus connected between the first and second networks for selectively transferring data packets between the first and second networks, the apparatus comprising storage means for storing data packets transferred over the first and second networks, said storage means including a first data buffer area containing data packets to be transferred from the second network to the first network, and a second data buffer area containing data packets to be transferred from the first network to the second network, evaluating means, coupled to the storage means, for storing in the first data buffer area data packets transferred over the second network which do not contain a destination address corresponding only to one of the nodes connected to the second network, and for storing in the second data buffer area data packets transferred over the first network which contain a destination address corresponding to the nodes connected to the second network and at least some data packets transferred over the first network which contain a destination address not corresponding to the nodes connected to the second network;

first transceiver means, connected to the first network and coupled to the storage means and to the evaluating means, for receiving data packets transferred over the first network and for transmitting data packets from the first data buffer area to the first network; and second transceiver means, connected to the second network and coupled to the storage means and to the evaluating means, for receiving data packets transferred over the second network and for transmitting data packets from the second data buffer area to the second network.

14. The system of claim 13 wherein the evaluating means includes a host computer comprising:

means for determining whether the data packets transferred over the second network contain a destination address corresponding only to one of the nodes connected to the second network or to the host computer; and means for storing in the first data buffer area data packets transferred over the second network which do not contain a destination address corresponding only to one of the nodes connected to the second network or to the host computer.

15. The system of claim 13 wherein the evaluating means includes means for filtering the data packets transferred over the second network to exclude all data packets having a destination address corresponding only to one of the nodes connected to the second network.

16. The system of claim 15 wherein the evaluating means further includes a host computer comprising:

means for determining whether the data packets transferred over the second network which are not filtered by the filtering means contain a destination address corresponding only to the host computer; and means for storing in the first data buffer area data packets transferred over the second network which are not filtered by the filtering means and which do not contain a destination addresses corresponding only to the host computer.

17. The system of claim 13 wherein the evaluating means includes a host computer comprising:

means for determining whether the data packets transferred over the first network contain a destination address corresponding only to the host computer; and means for storing in the second data buffer area data packets transferred over the first network which do not contain a destination address corresponding only to the host computer.

18. The apparatus of claim 13 wherein the evaluating means includes means for filtering the data packets transferred over the first network according to a logical address filter performed on the destination address of the data packets transferred over the first network.

19. The system of claim 18 wherein the evaluating means further includes a host computer comprising:

means for determining whether the data packets transferred over the first network which are not filtered by the filtering means contain a destination address corresponding only to the host computer; and means for storing in the second data buffer area data packets transferred over the first network which are not filtered by the filtering means and which do not contain a destination addresses corresponding only to the host computer.

20. The system of claim 13 wherein the evaluating means stores in the second data buffer area all data packets transferred over the first network.

21. In a network adapter connected between a first network and a second network, a method for selectively transferring data packets between the first and second networks, wherein each of the first and second networks connects a different plurality of nodes and each of the data packets contains a destination address corresponding to at least one of the nodes, the method comprising the steps of:

receiving data packets transferred over the first network;

storing in a first data buffer data packets received from the first network which contain a destination address corresponding to the nodes on the second network and at least some data packets received from the first network which contain a destination address not corresponding to the nodes connected to the second network;

transmitting on the second network the data packets stored in the first data buffer;

receiving data packets transferred over the second network;

storing in a second data buffer data packets received from the second network which do not contain a destination address corresponding only to one of the nodes connected to the second network; and transmitting on the first network the data packets stored in the second data buffer.

22. The method of claim 21 wherein the step of storing in a second data buffer comprises the sub-steps of:

determining in a host computer whether the data packets received from the second network contain a destination address corresponding only to one of the nodes connected to the second network or to the host computer; and storing in the second data buffer data packets received from the second network which do not contain a destination address corresponding only to one of the nodes connected to the second network or to the host computer.

23. The method of claim 21 further comprising the step of:

filtering the data packets received from the second network to exclude all data packets having a destination address corresponding only to one of the nodes connected to the second network.

24. The method of claim 23 wherein the step of storing in a second data buffer comprises the sub-steps of:

determining in a host computer whether the data packets received from the second network which are not filtered by the preceding filtering step contain a destination address corresponding only to the host computer; and storing in the second data buffer area data packets received from the second network which are not filtered by the filtering step and which do not contain a destination addresses corresponding only to the host computer.

25. The method of claim 21 wherein the step of storing in a first data buffer comprises the sub-steps of:

determining in a host computer whether the data packets received from the first network contain a destination address corresponding only to the host computer; and storing in the first data buffer area data packets received from the first network which do not contain a destination address corresponding only to the host computer.

26. The method of claim 21 further comprising the step of:

filtering the data packets transferred over the first network according to a logical address filter performed on the destination address of the data packets received from the first network.

27. The method of claim 26 wherein the step of storing in a first data buffer comprises the sub-steps of:

determining in a host computer whether the data packets received from the first network which are not filtered by the preceding filtering step contain a destination address corresponding only to the host computer; and storing in the first data buffer area data packets received from the first network which are not filtered by the preceding filtering step and which do not contain a destination address corresponding only to the host computer.

28. The method of claim 21 wherein all data packets transferred over the first network are stored in the first data buffer.

* * * * *